United States Patent [19]
Morita et al.

[11] Patent Number: 5,825,581
[45] Date of Patent: Oct. 20, 1998

[54] MAGNETIC DISK DRIVE WHERE SEEK SPEED DEPENDS ON ATMOSPHERIC PRESSURE AND SEEK DIRECTION

[75] Inventors: Yasuhiro Morita; Kotaro Yamamoto, both of Tokyo, Japan

[73] Assignee: Kabushiki Kaisha Toshiba, Kawasaki, Japan

[21] Appl. No.: 722,775

[22] Filed: Sep. 27, 1996

[30] Foreign Application Priority Data

Feb. 21, 1996 [JP] Japan ..................... 8-033715

[51] Int. Cl.$^6$ ........................... G11B 5/596
[52] U.S. Cl. ..................... 360/78.04; 360/78.07
[58] Field of Search .................. 360/75, 78.01, 360/78.04, 97.02, 78.07; 369/44.25, 44.27, 44.28, 44.32, 53

[56] References Cited

U.S. PATENT DOCUMENTS 4,642,715 2/1987 Ende ..................... 360/97.02
5,189,571 2/1993 Murphy et al. .

FOREIGN PATENT DOCUMENTS 63-195893 8/1988 Japan .
63-317993 12/1988 Japan .

*Primary Examiner*—Paul W. Huber
*Attorney, Agent, or Firm*—Finnegan, Henderson, Farabow, Garrett & Dunner, L.L.P.

[57] ABSTRACT

A magnetic disk drive, which controls the seek and positioning of a magnetic head for recording and reproducing data to a specific position on the magnetic disk in accordance with the servo data recorded in the magnetic disk, comprises measuring means for measuring one of an atmospheric pressure and a height above sea level and head positioning control means for setting a seek speed in accordance with the measured values measuring by said measuring means, and for controlling the seek and positioning of the magnetic head to the specific position on the disk at the set seek speed.

7 Claims, 7 Drawing Sheets

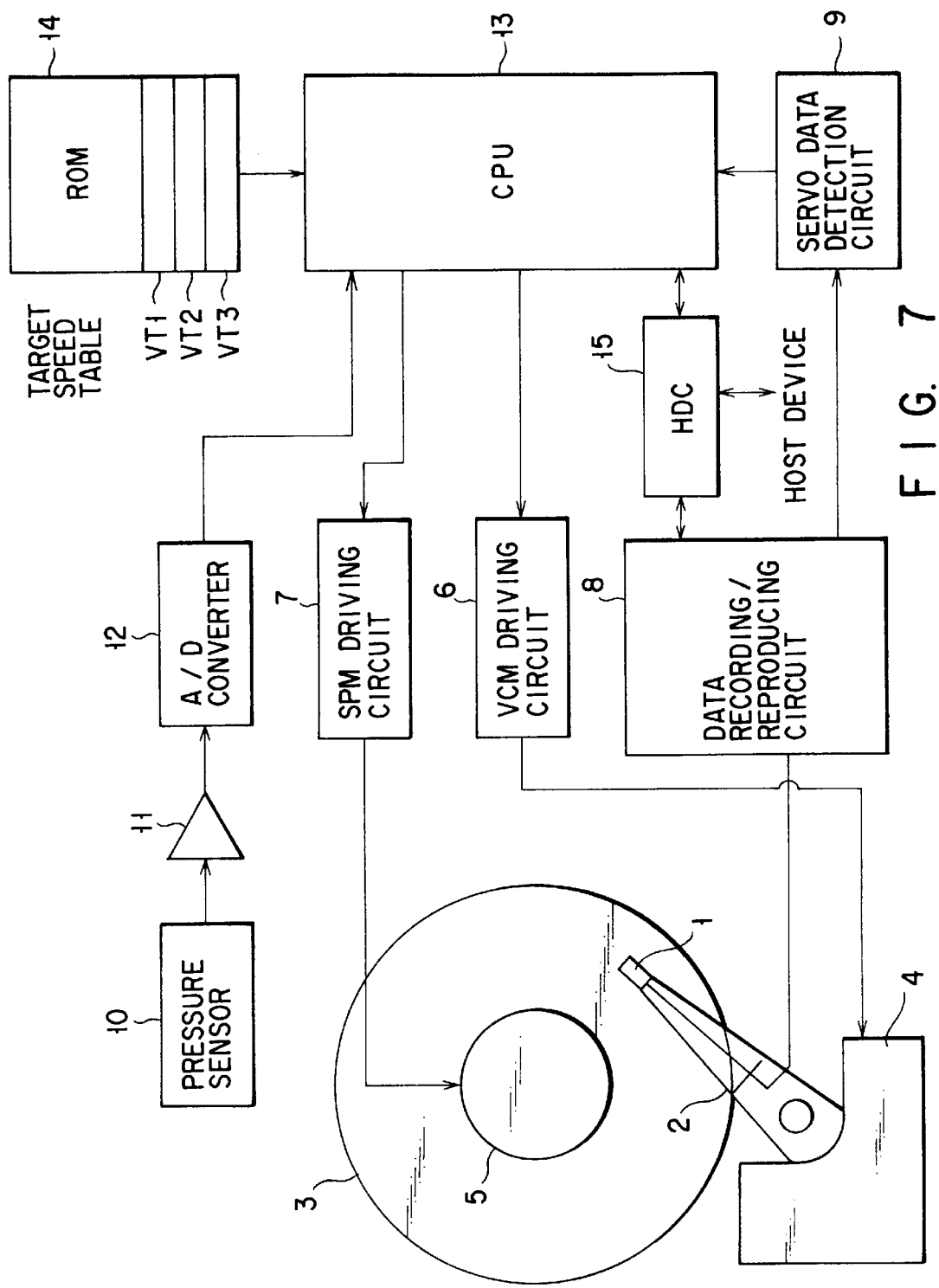
F I G. 7

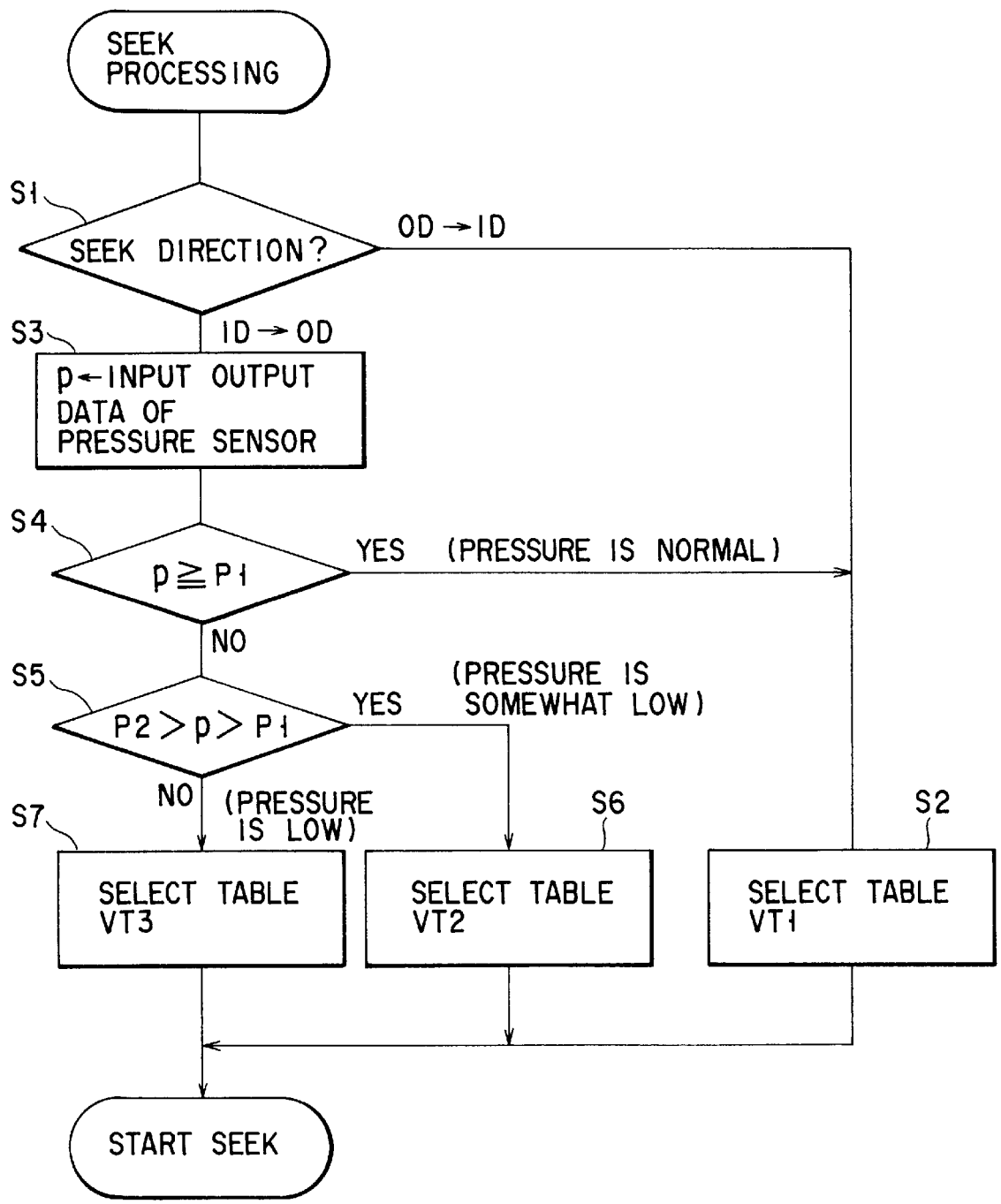
F I G. 8

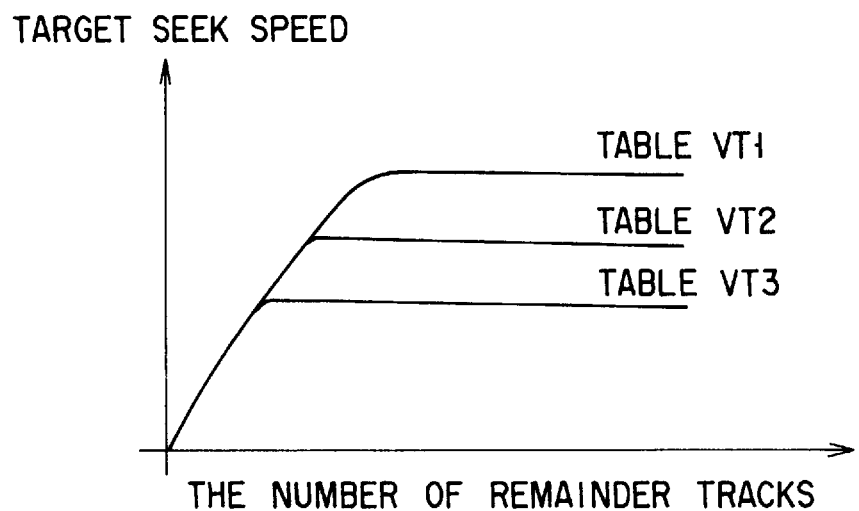
F I G. 9
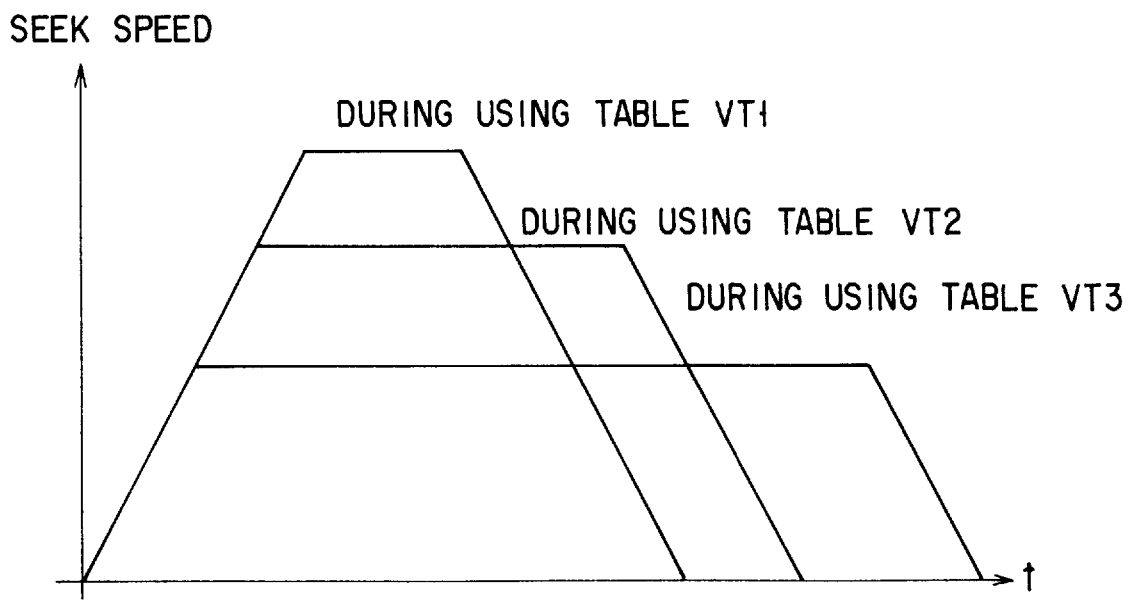
F I G. 10

MAGNETIC DISK DRIVE WHERE SEEK SPEED DEPENDS ON ATMOSPHERIC PRESSURE AND SEEK DIRECTION

BACKGROUND OF THE INVENTION

1. Field of the Invention

The present invention relates to a magnetic disk drive, which performs the seek/positioning control of a magnetic head for recording and reproducing data to a specific position on a magnetic disk, in accordance with servo data recorded on the magnetic disk, and to a seek control method applied to the magnetic disk drive.

2. Description of the Related Art

Generally, a magnetic disk drive has a construction as shown in FIG. 1. In such a magnetic disk drive, a rotary actuator 63 is widely used for the purpose of moving a magnetic head 62, which reads and writes the information, in relation to a magnetic disk (medium) 61. The magnetic head 62 is attached to the tip of the rotary actuator 63. The rotary actuator 63 rotates (moves rotationally) around a bearing 65 as center, by means of a voice coil motor 64. As results, the magnetic head 62 is moved in the direction of the radius of the disk 61. By controlling the moving amount (and the moving speed), the magnetic head 62 can be positioned in a desired track on the magnetic disk 61 rotating at a high speed by means of a spindle motor (SPM) 66.

When the magnetic disk drive is operated, the magnetic head 62 is flying at a height of an order of submicrons from the magnetic disk 61, as a result of a dynamic pressure effect of air flow caused by the rotation of the magnetic disk 61. Meanwhile, the magnetic disk 61 is rotating at a speed as high as 3,600 to 7,200 rpm. With this reason, if a clash occurs between the flying magnetic head 62 and the magnetic disk 61, the impact resulting from the clash will cause a serious risk in the aspect of the reliability such that the magnetic disk 61 is damaged or that the head crush occurs.

As shown in FIG. 2, when microscopically observed, the magnetic disk is not flat and has irregularity (bump) of the order of from several nanometers to tens of nanometers. The minimum head flying height, which can prevent the clash between the highest bump on the disk and the magnetic head (magnetic head slider) flying above the magnetic disk, is commonly called a glide height. Accordingly, the flying height of the magnetic head is required to be always secured at a height not less than the glide height, in the use conditions adopted for the drive.

The fluctuation factors, which vary the flying height of the magnetic head, include the variation of the flying height due to the processing/assembly tolerance of the magnetic head itself, and the factors derived from the use conditions of the drive. Of these factors, the former variation, i.e., the variation of the flying height of the magnetic head itself, can be inspected by the measurement of the flying height of the magnetic head, prior to the assembly.

The following two items are identified as influential among those latter fluctuation factors which are derived from the use conditions of the drive.

(1) Reduction in the flying height due to the atmospheric pressure used or the height above sea level.

Generally, the magnetic disk guarantees that is works at a height up to 3,000 m above sea level. The height of 3,000 m above sea level is converted to 0.7 atm. Due to this variation in the pressure, the flying amount of the magnetic head decreases.

An example of change in the flying amount, depending on the pressures, of TPC (Transversal Pressurizing Contour) head (TPC slider head) is shown in FIG. 3. FIG. 3 provides the relationship between the location in the disk radius (the location of the head in the direction of the disk radius) and the flying height, obtained by applying a finite element method to the change in the pressure. According to the exemplified head, the flying height of about 70 nm, which is exhibited at a normal state, i.e., 1 atm or at 0 m above sea level, decreases by about 12 to 15 nm at 0.7 atm or at 3,000 m above sea level.

(2) Reduction in flying height due to seek operation.

In the case of a magnetic disk drive using a rotary actuator as shown in FIG. 1, the magnetic head has a certain angle between the longitudinal direction (in the direction of central axis) of the magnetic head and the direction of circumferential speed (tangential direction of the diameter) of the magnetic disk, depending on the location in the radius of the magnetic disk. This angle is commonly referred to as a skew angle (or a yaw angle). The head flying amount varies, because the mode of air flow changes depending on the skew angle.

The skew angle dependence of the flying amount of the above-mentioned TPC head is shown in FIG. 4. In FIG. 4, the skew angle dependence of the flying amount is expressed in change (%) in accordance with the flying amount (100%) in which skew angle is 0 degree (0°).

Meanwhile, the head flying amount depends on the circumferential speed of the disk such that the flying amount generally increases as the circumferential speed increases. As a result, on the outermost diameter side of the magnetic disk the head flying amount tends to increase. Increase in the head flying amount makes it difficult to obtain good recording properties, because the distance from the magnetic layer of the magnetic disk becomes larger. However, if an optimum skew angle is assigned to a disk radius by the utilization of the skew angle dependence of the head flying amount as shown in FIG. 4, a nearly flat flying amount (flying height), which is distributed from the innermost diameter side to the outermost diameter side of the disk as exhibited by the 1 atm state of FIG. 3, can be obtained.

The change in the flying height at the time of seek operation will be considered. FIG. 5 illustrates the outline of the change of the air flow direction at the seek operation. When seek (movement of the head from one track to another) is carried out, the actual flow of air is expressed as a vectorial sum of the seek speed and the circumferential speed by the rotation of disk and therefore an angle θ'y about the central axis of the head differs from θy that is the skew angle in a static state.

For example, in the case of a TPC head, the flying height tends to vary depending on the change in the skew angle as shown in FIG. 4, and therefore the flying height varies in response to the foregoing change during seek operation.

FIGS. 6A to 6C show the change in flying height during seek operation by way of simulation. The seek operation at the seek speeds indicated in FIG. 6A causes the change in skew angle as indicated in FIG. 6B with the result that the flying height (of the innermost diameter side) decreases by about 17 nm relative to the static state of head when the seek is from the innermost diameter side to the outermost diameter side of the magnetic disk (i.e., ID→OD) as shown in FIG. 6C. Incidentally, the flying height increases when the seek is from the outermost diameter side to the innermost diameter side of the magnetic disk (i.e., OD→ID).

Therefore, when designing a magnetic disk drive, by taking into account these fluctuation factors of the magnetic head, measures are taken to prevent the clash between the head and the disk design in such a way that the head flying height is greater than the glide height even in the worst case. For example, in the case of the magnetic heads (TPC heads) having the aforementioned flying properties, the difference of minimum flying height from the glide height of magnetic disks (media) is required to be not less than about 30 nm, i.e., the sum of decrements of 12 nm due to pressure (height above sea level) and of 17 nm due to seek, in the face of the variegated magnetic head units.

As described above, in the case of conventional magnetic disk drives, the difference between the magnetic head flying amount and the glide height is required to be set to a fairly large value by taking into account the fluctuation factors of the flying heights of the magnetic heads.

On the other hand, from the viewpoint of enhancing the recording density, it is an effective means to decrease the flying height. With regard to the reduction in the flying height, effort has been centered on the reduction of the height of the bump, i.e., the reduction in the glide height, on the magnetic disk. However, the reduction in the surface roughness of the disk for the purpose of decreasing the height of the bump on the magnetic disk is associated with increase of such a risk that the magnetic head might be adsorbed onto the magnetic disk when the drive is not operated.

SUMMARY OF THE INVENTION

The object of the present invention is to provide a magnetic disk drive and a seek control method applied thereto which can reduce the magnetic head flying height without failing the reliability and can enhance the recording density by obtaining a good recording/reproducing property. A magnetic disk drive according to the present invention, which controls the seek and positioning of a magnetic head for recording and reproducing data to a specific position on the magnetic disk in accordance with the servo data recorded in the magnetic disk, is characterized by comprising: measuring means for measuring one of an atmospheric pressure and a height above sea level; and head positioning control means for setting a seek speed in accordance with the measured values measuring by the measuring means, and for controlling the seek and positioning of the magnetic head to the specific position on the disk at the set seek speed. Another magnetic disk drive according to the present invention is characterized by comprising: measuring means for measuring one of an atmospheric pressure and a height above sea level, memory means for storing plural types of target speed tables indicating the relationship between the number of remainder tracks from a target track and the target seek speed of the magnetic head at a seek operation, and head positioning control means for selecting one of the plural type of the target speed tables stored in the memory means, in accordance with the measured values by the measuring means, setting a target seek speed according to the selected target speed table, and controlling the seek and positioning of the magnetic head to the specific position on the disk at the target speed. A seek controlling method applied to a magnetic disk drive is characterized by comprising the steps of: measuring one of an atmospheric pressure and a height above sea level; and setting the seek speed when controlling the seek and positioning control of the magnetic head to the specific position on the disk.

According to the present invention, the fluctuation in the magnetic head flying height due to either atmospheric pressure or height above sea level, can be controlled by changing the seek speed in accordance with either atmospheric pressure or height above sea level. In particular, by changing the seek speed so that the seek speed decreases as the atmospheric pressure becomes lower or as the height above sea level is larger, that is, by decreasing the seek speed as the atmospheric pressure drops, it becomes possible to control the minimum flying height of the magnetic head above a certain height (preventing the clash thereof with the magnetic disk) even under a low atmospheric pressure, although the seek time becomes longer. That is to say, it is possible to set the flying height of the magnetic head under the worst use condition of the magnetic disk to a height greater than that of conventional magnetic disk drives. Because of this, it becomes possible to obtain the following advantageous effects.

(1) In the case where the magnetic head flying amount is set to the same as in the case with conventional magnetic disk drives, the difference between the magnetic head and the glide height of the magnetic disk increases thereby increasing the reliability.

(2) In the case where the difference between the magnetic head flying height and the glide height of the magnetic disk is set to the same as in the case with conventional magnetic disk drives, the magnetic head flying amount can be decreased without failing the reliability thereby enabling to obtain better recording/reproducing property thus leading to the enhancement of the recording density.

Further, the present invention is characterized in that the seek speed is set such that the seek speed decreases as the atmospheric pressure becomes lower. The seek speed is set in accordance with the measured values measured by the measuring means, to the seek speed different from a reference value, only when the seek is made in a predetermined direction. The predetermined direction is the direction from the innermost diameter side to the outermost diameter side of the magnetic disk.

Thus, according to the present invention, it is possible to limit the lengthened seek time as a result of the decreasing the seek speed, i.e., the lowering of the performance, to the case when a seek is made in a specific direction. In particular, at the seek operation from the outermost diameter side to the innermost diameter side of the magnetic disk, it is not necessary to decrease the seek speed for the prevention of the reduction in the magnetic head flying amount because flying amount of the magnetic head is on the rise during the seek operation. Therefore, since seek speed changing operation is restrained, it is possible to suppress the drop in the performance. In this case, since the flying amount does not increase more than necessary, the drop in the recording density does not occur.

In addition, according to the present invention, by effectively utilizing a measuring means to determine either the atmospheric pressure or height above sea level pertaining to the drive, it is possible to prevent the use of the drive under an abnormally low atmospheric pressure that is not guaranteed for the product.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 7 is a block diagram showing the outline of the construction of a magnetic disk drive relating to an embodiment of the present invention;

FIG. 8 is a flow chart explaining the selection of the target speed table at the time of head positioning control in the above-mentioned embodiment;

FIG. 9 is an illustration showing the relation of the target speed (target seek speed) to the number of remainder tracks as indicated by the target speed tables VT1 to VT3 stored in ROM 14 of FIG. 7;

FIG. 10 is an illustration showing an example of the difference of seek speed depending on the difference of the target speed.

DETAILED DESCRIPTION OF THE PREFERRED EMBODIMENTS

Figure 1:
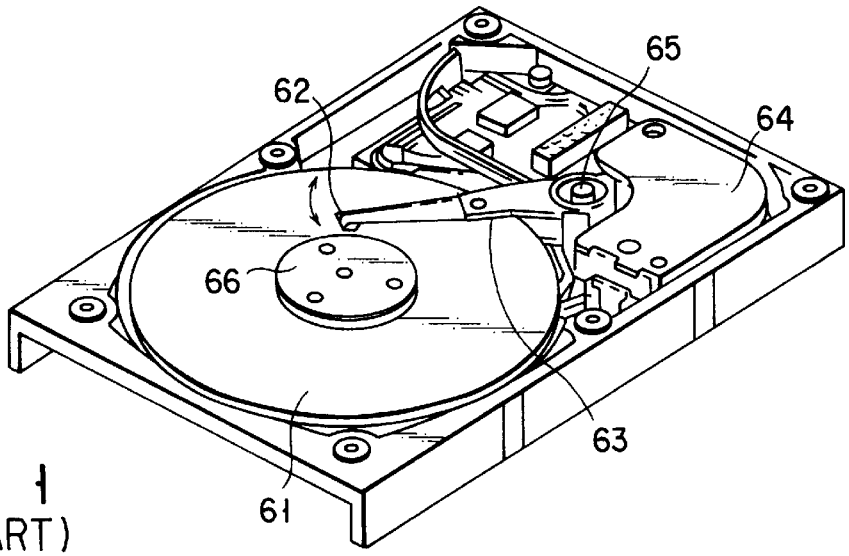
FIG. 1 is an illustration showing the outline of the construction of a common magnetic disk drive.
Figure 2:
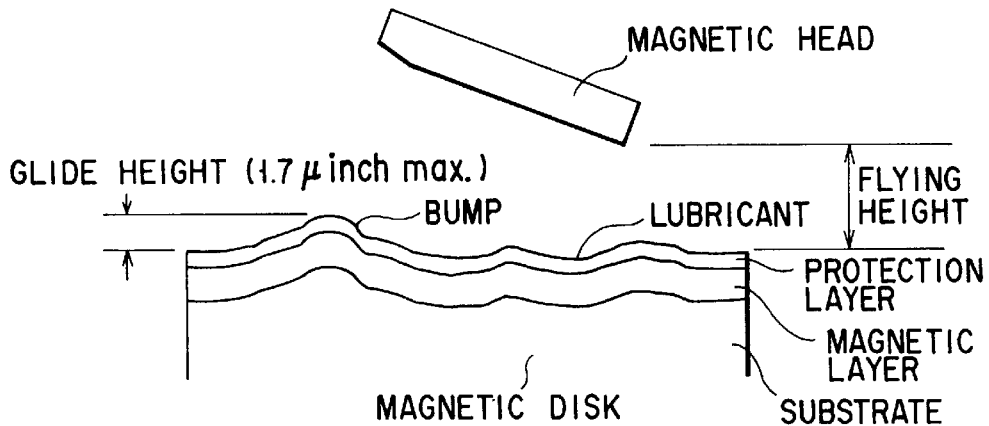
FIG. 2 is an illustration schematically showing the relationship between the surface configuration of a magnetic disk and a magnetic head flying above the foregoing disk.
Figure 3:
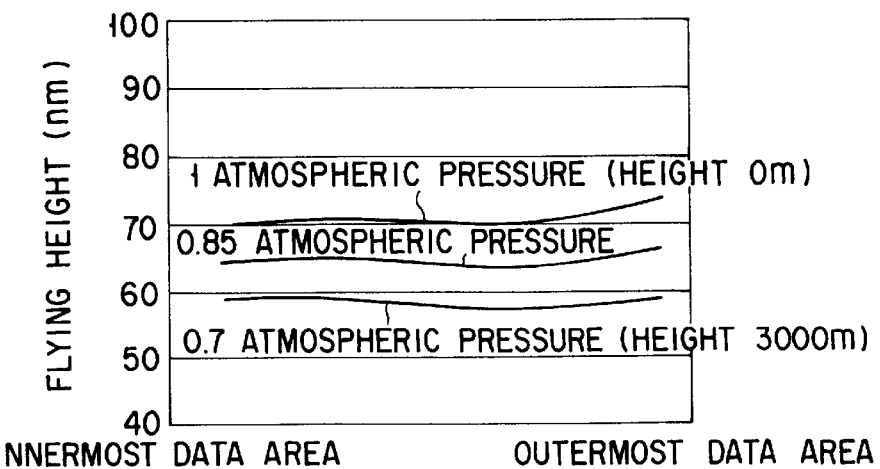
FIG. 3 is an illustration showing an example of the change in the flying height for TPC head due to atmospheric pressures.
Figure 4:
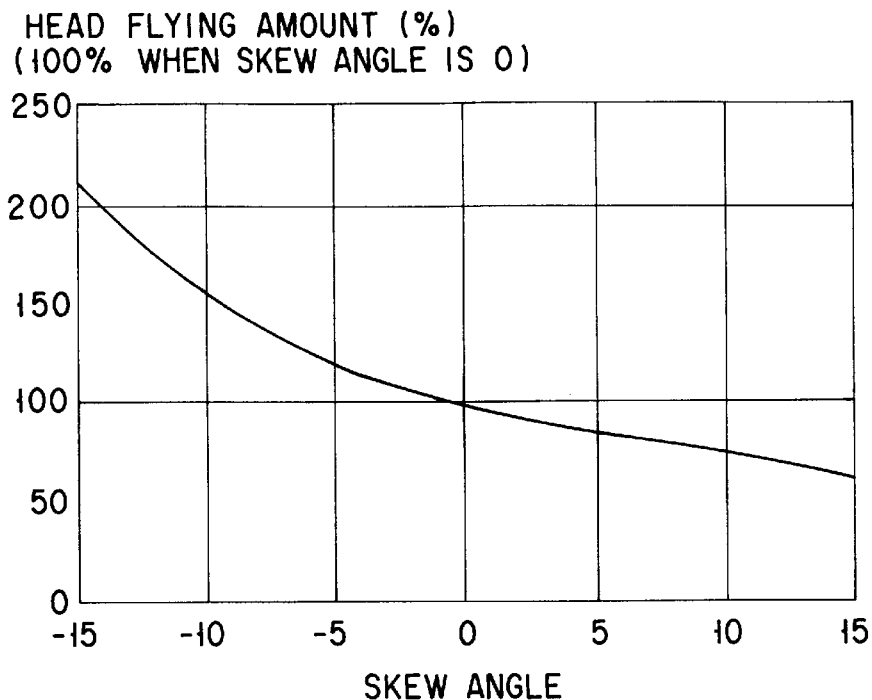
FIG. 4 is an illustration showing the skew angle dependence of head flying amount for TPC head.
Figure 5:
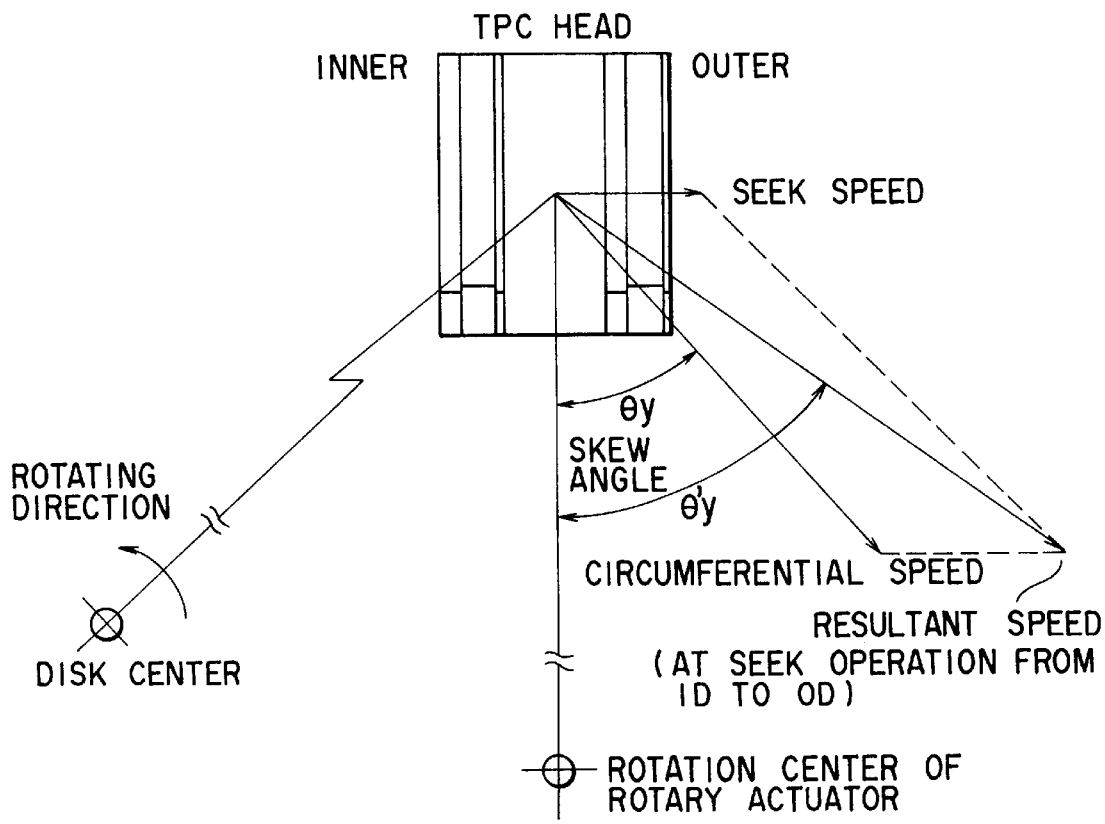
FIG. 5 is an illustration explaining the change in skew angle at the time of seek operation.

Below, the embodiment of the present invention is explained with reference to the drawings.

FIG. 7 is a block diagram showing the outline of the construction of a magnetic disk drive (HDD) relating to an embodiment of the present invention.

In FIG. 7, a magnetic head 1, which is represented by the aforementioned TPC head, has a magnetoelectric conversion section (transducer) which is not shown. The magnetic head 1 is held in a rotary actuator 2 and moves (and/or seeks), for example, in the direction of the radius of a 2.5-inch magnetic disk (medium). The magnetic head 1 flies above a magnetic disk 3 while keeping a very small gap therefrom by a speed relative to the speed of the magnetic disk 3. The magnetic head 1 (and the rotary actuator 2 that holds the magnetic head 1) is generally provided to each surface of the magnetic disk 3.

The rotary actuator 2 rotates in the direction of the radius of the magnetic disk 3 by means of a voice coil motor (VCM) 4.

The magnetic disk 3 is rotated at a high speed by means of a spindle motor (SPM) 5. On both sides of the magnetic disk 3 there are many tracks formed, presenting a format structure where each of the tracks is divided into plural sectors (servo sectors). Each of the sectors is comprised mainly of a servo area, where the servo data are recorded in order to carry out the head positioning control, and a data area intended for recording ordinary data (user data).

VCM 4, which is driven by the controlling current (VCM current) supplied from a VCM driving circuit 6, drives (the rotary actuator 2 that holds) the magnetic head 1. SPM 5, which is driven by the controlling current (SPM current) supplied from an SPM driving circuit 7, rotates the magnetic disk 3 at a high speed. The value (i.e., the controlling amount) that determines the controlling current to be supplied to VCM 4 and SPM 5 is determined by the computation by means of CPU 13. The VCM driving circuit 6 drives VCM 4 in accordance with the controlling amount supplied from CPU 13 and in a similar manner the SPM driving circuit 7 drives SPM 5 in accordance with the controlling amount supplied from CPU 13.

The magnetic head 1 is connected to a data recording/reproducing circuit 8 via, for example, a head IC (not shown) which is mounted on a flexible printed circuit board (FPC) (governing the switching of the magnetic head 1, the output or input of read/write signals to the magnetic head 1, and the like). The data recording/reproducing circuit 8 has a data reproducing function, which reproduces data from the read signals read out by (the magnetoelectric conversion section belonging to) the magnetic head 1 and a data recording function which provides the write current, corresponding to the write data given from a disk controller (HDC) 15, to the magnetic head 1. The data to be reproduced by the data reproducing function of the data recording/reproducing circuit 8 are roughly divided into servo data and user data.

The data recording/reproducing circuit 8 is connected to a servo data detection circuit 9. The servo data detection circuit 9 has a head position information generating function to detect the servo data from the reproduced data obtained from the data recording/reproducing circuit 8 and to generate the head position information of the magnetic head 1 in accordance with the servo data thus detected. The position information generated by the servo data detection circuit 9 is given to CPU 13.

Generally, the data recording/reproducing circuit 8 and the servo data detection circuit 9 are combined into an integrated circuit called read IC.

Besides, the magnetic disk drive of FIG. 7 is provided with a pressure sensor 10 which measures the atmospheric pressure of the environment where the magnetic disk drive is used. As the pressure sensor 10, use is made, for example, of a piezoelectric pressure sensor or a semiconductor strain gauge.

Connected to the pressure sensor 10 is an amplifier 11 which amplifies the measured output. And, connected to the amplifier 11 is an A/D (analog/digital) converter 12 which converts the amplified, measured output of the pressure sensor 10 into a digital value. The output of the A/D converter 12 (digital, measured data of the atmospheric pressure) is given to CPU 13.

CPU 13 is, for example, a one-chip microprocessor. Together with the servo data detection circuit 9, CPU 13 constitutes a servo system (head positioning control mechanism) for head positioning control and carries out the head positioning control so that the magnetic head 1 is positioned toward a target cylinder in accordance with the positioning information given by the servo detection circuit 9.

CPU 13 carries out the seek speed control that accompanies the head positioning control by taking into account not only the conventionally known number of the remainder cylinders (tracks) present from the cylinder, in which the magnetic head 1 is presently located, to the target cylinder but also the measurement data of the pressure as provided from the A/D converter 12.

Besides the head positioning control, CPU 13 carries out the transfer control of the read/write data by controlling an HDC 15.

A nonvolatile memory, for example, ROM 14 is connected to CPU 13. The ROM 14 stores a control program of CPU 13 as well as tables showing the relation of the target speed (target seek speed) to the number of the remainder cylinders (tracks), for example, (data for) 3 target speed tables VT1, VT2 and VT3. In this case, the target speed table VT1, which has been prepared hitherto, is used where the atmospheric pressure p is not less than the predefined value P1. On the other hand, the target speed tables VT2 and VT3 have been newly prepared, and the table VT2 is used where the atmospheric pressure p falls between the predefined values P1 and P2 (P2<P1), and the table VT3 is used where the atmospheric pressure is not greater than the predefined value P2. The difference concerning the target speed tables VT1 to VT3 is explained later.

HDC 15 constitutes the interface between a host device (not shown) and the magnetic disk drive and is mostly assigned to the transfer of the read/write data. In addition, in accordance with the seek command and the like from the host device, HDC 15 gets the target cylinder number in which the magnetic head 1 should be positioned and outputs it to CPU 13.

Below, the operation of the device shown in FIG. 7, placing emphasis on the positioning control (speed control) by means of CPU 13, is explained with reference to the flow chart of FIG. 8.

Given a read/write command or a seek command from the host device, HDC 15 prepares the target cylinder number indicating the target cylinder, in which the magnetic head 1 should be positioned, from the logical address contained in the command and outputs it to CPU 13.

On receiving it, CPU 13 starts seek operation to move (seek) the magnetic head 1 to the target cylinder. In this operation, the read signal, which is read out from the magnetic disk 3 by means of (the magnetoelectric conversion section of) the magnetic head 1, is given to the data recording/reproducing circuit 8.

The data recording/reproducing circuit 8 reproduces data from the read signal read out by the magnetic head 1. The servo data detection circuit 9 detects the servo data from the data reproduced by the data recording/reproducing circuit 8. And, the servo data detection circuit 9 generates the head position information of the magnetic head 1 in accordance with the servo data thus detected. The information generated by the servo data detection circuit 9 is output to CPU 13. The position information includes the cylinder number indicating the cylinder position in which the magnetic head 1 is currently located. In addition, the position information includes position error data indicating the displacement from the center of track, but explanation about such additional information, which is not directly related to the present invention, is omitted.

Besides, while the drive is active, the pressure sensor 10 measures the atmospheric pressure of the environment where the magnetic disk drive is placed, and outputs the measured values. The output of the pressure sensor 10 (sensor output) is amplified by the amplifier 11 and is converted into digital data by the A/D converter 12.

CPU 13 controls the speed required for moving the magnetic head 1 to the target cylinder in accordance with the cylinder number and the target cylinder number that are indicated by the position information given by the servo detection circuit 9. Heretofore, this speed is controlled in accordance with the number of the remainder cylinders (tracks) to the target cylinder (target track). In the present embodiment, however, the speed is controlled in accordance with the number of the remainder cylinders (tracks) and on the atmospheric pressure measured by the pressure sensor 10 (provided that the seek is from the innermost diameter side to outermost diameter side of the magnetic disk 3).

Figure 6A:
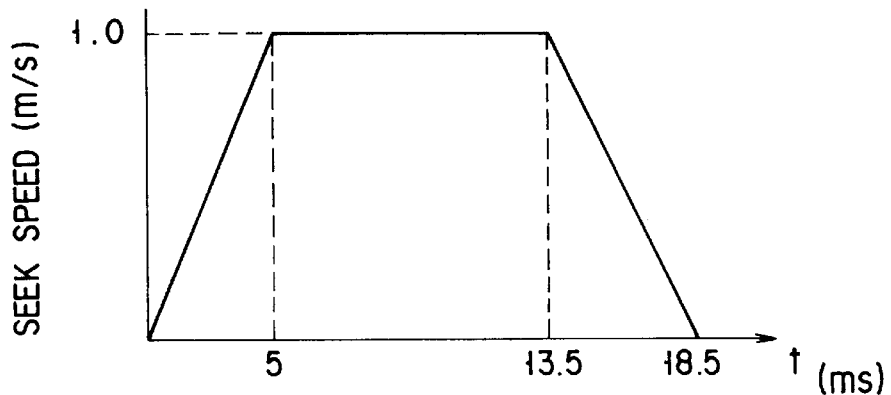
FIGS. 6A to 6C are illustrations each showing an example of change in the head flying height at the seek operation.
Figure 6B:
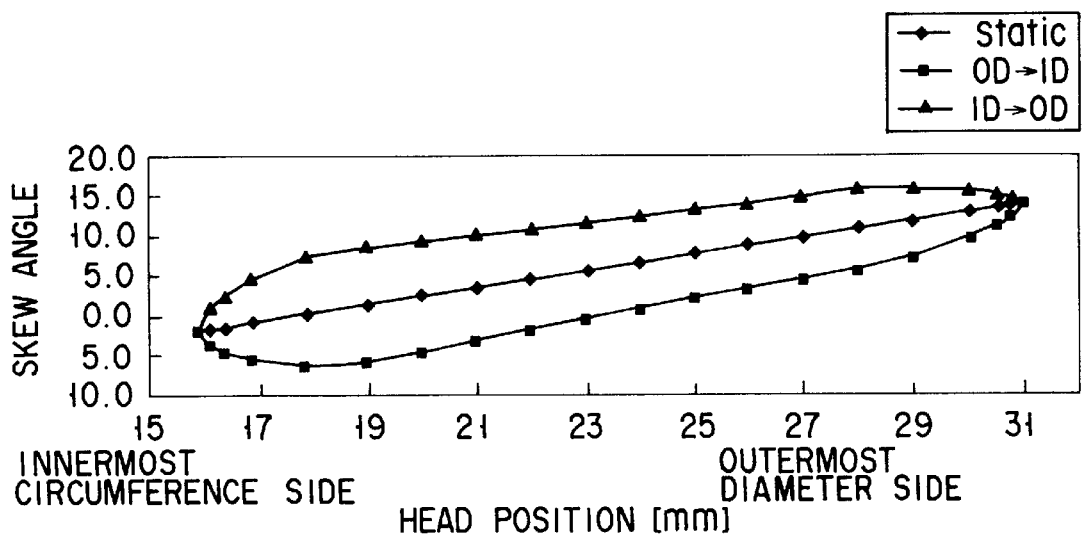
Figure 6C:
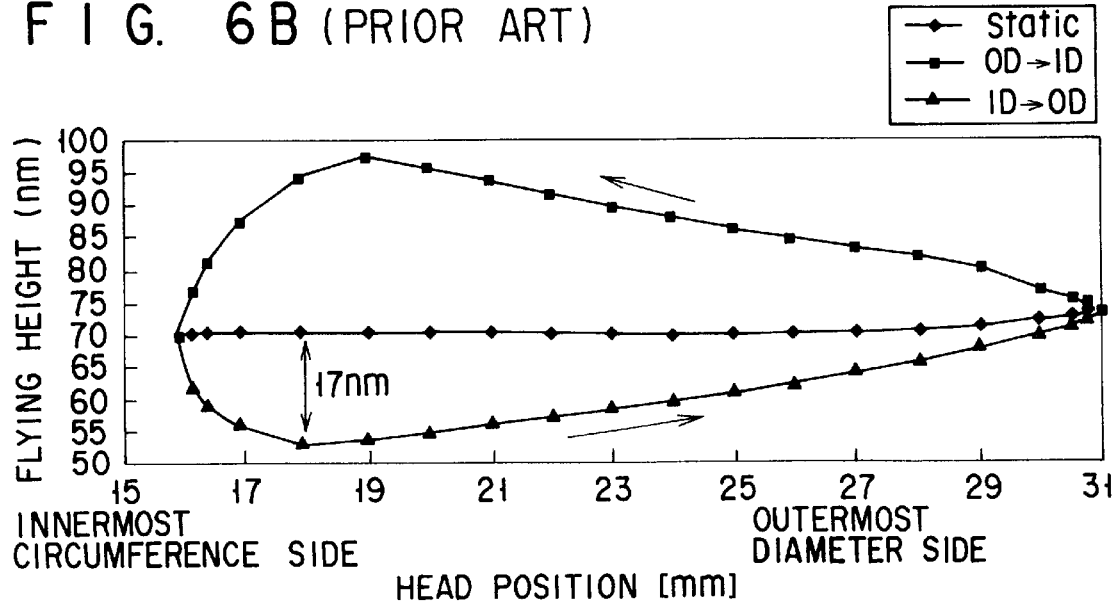

That is to say, CPU 13 takes from the A/D converter 12 the atmospheric data measured by the pressure sensor 10 and controls the seek speed by selecting the target speed table such that the minimum flying height of the magnetic head 1 for the pressure is greater than the glide height of the magnetic disk 3, when the seek is from the innermost diameter side to the outermost diameter side of the magnetic disk 3 thus associated with the reduction in the head flying height as explained with reference to FIGS. 6A to 6C. In this case, even if the numbers of the remainder cylinders are the same, the seek speed is decreased as the atmospheric pressure drops (as the height above sea level becomes larger).

The detail of the target speed table selecting operation for the purpose of speed control in the seek operation is described below with reference to the flow chart of FIG. 8.

On receiving from HDC 15 the number of the target cylinder in accordance with the read/write command or the seek command, CPU 13 judges whether the seek direction is from the outermost diameter to the innermost diameter (OD→ID) or from the innermost diameter to the outermost diameter (ID→OD) of the magnetic disk 3 in accordance with the target cylinder number and the cylinder number indicating the presently located position known through the position information given by the servo detection circuit 9 (step S1).

When the seek operation is from the outermost diameter to the innermost diameter associated with the increase of the flying amount, CPU 13 selects from the target speed tables VT1 to VT3 stored in ROM 14 the target speed table VT1, which has been hitherto used, (step S2) to control the seek operation using the table VT1.

Besides, FIG. 9 shows the relation of the target speed (target seek speed) to the number of the remainder cylinders (tracks) as illustrated by the target speed tables VT1 to VT3. As is evident from FIG. 9, even if the numbers of the remainder tracks are the same, the target speed of the target speed table VT1, which has been prepared hitherto, is the largest, while the target speed of the target speed table VT3 is the smallest.

Therefore, when a seek is from the outermost diameter to the innermost diameter, the target speed is set to a higher speed.

On the other hand, when the seek is from the innermost diameter to the outermost diameter associated with the decrease in the flying amount, CPU 13 takes from the A/D converter 12 the atmospheric pressure data measured by the pressure sensor 10 (step S3), and compares/judges (steps S4 and S5) the pressure (measured pressure) p of the atmospheric pressure data against the predefined values P1 and P2 (P2<P1).

Where the atmospheric pressure p is not less than the predefined value P1, the use of CPU 13 is under a normal atmospheric pressure, indicative of sufficient flying amount obtainable during seek operation, and therefore CPU 13 selects from the ROM 14 the target speed table VT1, which has been hitherto used, (step S2) to control the seek operation using the table VT1.

On the other hand, where the atmospheric pressure p is smaller than the predefined value P1, CPU 13 selects from the ROM 14 the target speed table VT2 or VT3 in accordance with the atmospheric pressure p in order to set the target speed to a value lower than the target speed table VT1 so that the reduction in the flying amount may be prevented.

That is, where the atmospheric pressure p falls between the predefined values P1 and P2, the use of CPU 13 is under an atmospheric pressure a little lower than normal, indicative of a slight reduction in the flying amount during seek operation, and therefore CPU 13 selects from the ROM 14 the target speed table VT2, which is intended for setting up a target speed lower than target speed table VT1, (step S6) to control the seek operation using the table VT2.

Where the atmospheric pressure p is not greater than the predefined value P2, the use of CPU 13 is under an atmospheric pressure lower than normal, indicative of reduction in the flying amount during seek operation, and therefore CPU 13 selects from the ROM 14 the target speed table VT3, which is intended for setting up a target speed lower than target speed table VT2, (step S7) to control the seek operation using the target speed table VT3.

Below, explanation is made of the seek speed control in compliance with the target speed table VTi (i=1 to 3) is selected.

After the target speed table VTi is selected, CPU 13 determines the target speed (target seek speed) commensurate with the number of the tracks presently remaining from the target track in accordance with the table VTi Further, in accordance with the position information obtained from the servo detection circuit 9, CPU 13 detects the moving speed of the magnetic head 1. This moving speed can be obtained by firstly calculating the distance of the movement between the position obtained currently by the servo data and the position obtained by the preceding servo data and then dividing the distance by one sector time. The one sector time means a span of time obtainable by dividing the time for one rotation of disk by the number of sectors for a track.

CPU 13 obtains the difference (error speed) between the obtained moving speed and the target speed (target seek speed) and provides the controlling amount of VCM 4, which corresponds to the foregoing difference, to the VCM driving circuit 6, and thus the positioning control of the magnetic head 1 is performed by means of the VCM current fed back to VCM 4.

The difference of the seek speed, depending on the difference by using the target speed tables VT1 to VT3, is shown in FIG. 10.

Figure 11A:
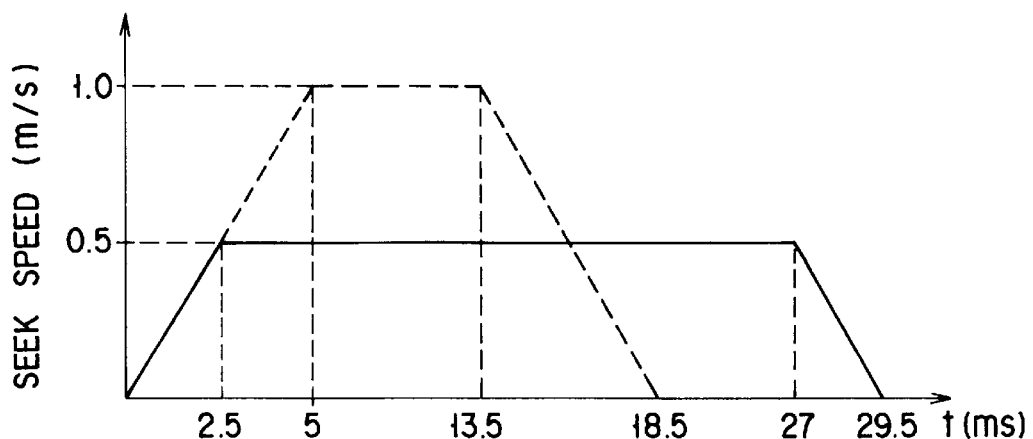
FIGS. 11A to 11C are illustrations each showing an example of the simulation results of the fluctuation in the head flying amount when the seek speed is decreased along with the change of seek speed with time.
Figure 11B:
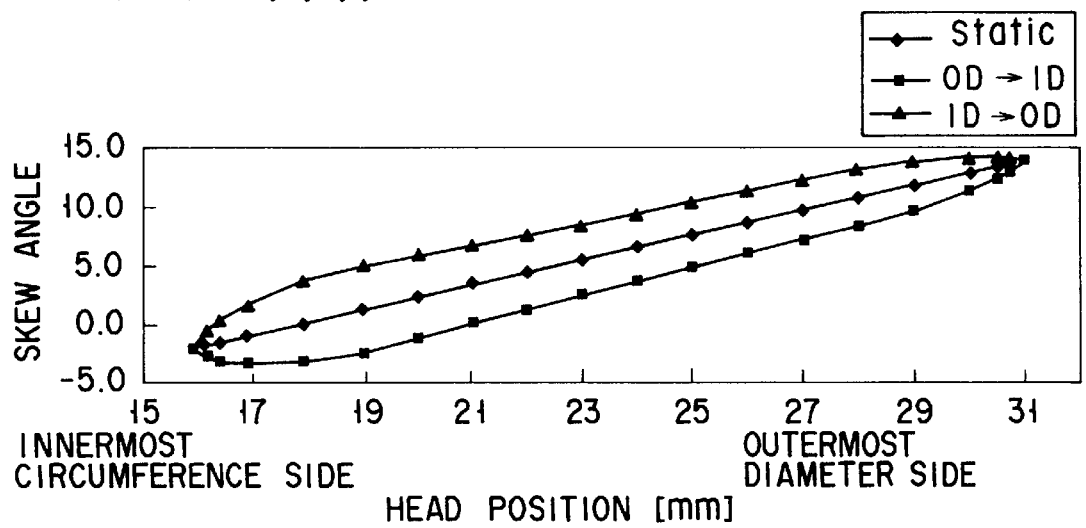
Figure 11C:
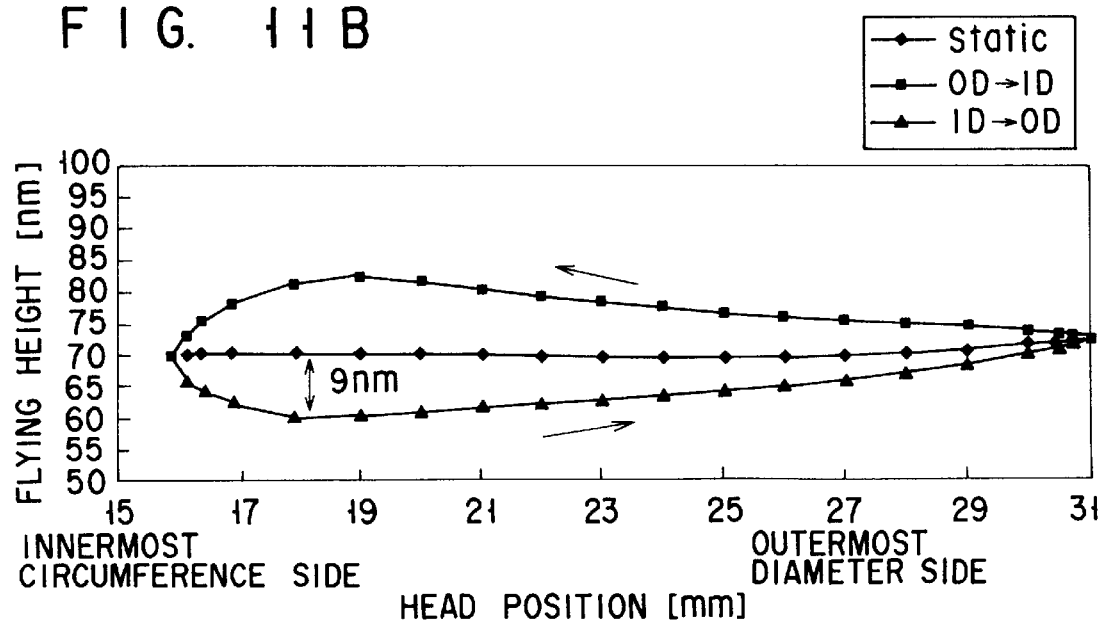

As described above, according to the present embodiment, when the seek is from the innermost diameter side to the outermost diameter side of the magnetic disk 3, it is possible to control the decrease in the flying amount due to the lower atmospheric pressure by reducing the seek speed as the atmospheric pressure p drops. FIGS. 11A to 11C show an example of the simulation results of the fluctuation in the flying amounts when the seek speed is reduced along with the change of seek speed with time. The example of the FIGS. 11A to 11C shows the result of the fluctuation in the flying amounts by use of the same magnetic head (TPC head) for the magnetic head 1 as in the example of FIGS. 6A to 6B except that the seek speed is halved (i.e., 50% of the speed of the example of FIGS. 6A to 6C).

As is evident from FIGS. 11A to 11C, it is possible to suppress the decrease in the flying height, which is expressed as the decrease in flying height relative to the flying height of the head in static state, to 9 nm as against 17 nm, i.e., nearly half, of the prior art. Besides, in a case of a seek operation from the outermost diameter side to the innermost diameter side, no reduction in the seek speed is required in this direction, because the flying height becomes larger than in static state as shown in FIGS. 11A to 11C.

As described above, in the present embodiment, the decrement in the flying height because of the atmospheric pressure is avoided by decreasing the seek speed, and, as a result, it can be assured that the flying height of the magnetic head 1 does not become lower than the minimum flying height for a normal use condition (1 atm or at a height of 0 m above sea level). Alternatively, even if there is a decrease in the flying height, the flying height can be limited to a height slightly lower that the minimum flying height in a normal state.

Although the present embodiment utilizes the pressure sensor 10 as a means of detecting the flying amount fluctuating factor of the magnetic head 1, a height sensor that detects the height above sea level may be used instead of the pressure sensor 10 because there is a certain relationship between the atmospheric pressure and the height. In this case, if the height that is detected (measured) by the height sensor is converted into atmospheric pressure in CPU 13, the same controlling procedure as in the present embodiment can be applied. Of course, the conversion into the atmospheric pressure is not necessary. If the conversion of the height into the atmospheric pressure is not employed, a target speed table is selected so that the seek speed becomes lower as the height above sea level is increased in the case the seek operation is from the innermost diameter side to the outermost diameter side.

While the explanation of the present embodiment relates to the use of 3 target speed tables VT1 to VT3 (stored in ROM 14) in order to set up the target speed (target seek speed) in accordance with the measured values of atmospheric pressure, 2 target speed tables may be used, or 4 target speed tables may be used in order to allow more minute change in the seek speed in accordance with the measured values of atmospheric pressure.

Specifically, if the bit number of the digital measured values of atmospheric pressure data read into CPU 13 from A/D converter 12 is, for example, 8, then in response to 256 values of the atmospheric pressure that the atmospheric pressure data can take, 256 target speed tables (a lower target speed is set up as the atmospheric pressure becomes lower) may be prepared so that the measured values of atmospheric pressure data read from A/D are capable of selecting the target speed table that corresponds directly to the foregoing data. Besides, the 256 values of the atmospheric pressure data that can be taken by 8-bit atmospheric pressure data may be divided into $2^n$ ranges of atmospheric pressure ($1 \leq n \leq 7$) to prepare $2^n$ target speed tables for the $2^n$ ranges of atmospheric pressure so that the directly corresponding target speed tables may be selected for top n bit values of the data read from A/D converter 12.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk drive, which controls a seek and positioning of a magnetic head for recording and reproducing data to a specific position on a magnetic disk in accordance with servo data recorded in the magnetic disk, comprising:

measuring means for measuring one of an atmospheric pressure and a height above sea level to obtain at least one measured value; and head positioning control means for setting a seek speed in accordance with said at least one measured value, and for controlling the seek and positioning of the magnetic head to the specific position on the magnetic disk at the set seek speed.

2. The magnetic disk drive according to claim 1, wherein said head positioning control means sets the seek speed such that the seek speed decreases as the atmospheric pressure becomes lower.

3. The magnetic disk drive according to claim 1, wherein said head positioning control means sets the seek speed in accordance with the measured values measured by said measuring means, to the seek speed different from a reference value, only when the seek is made in a predetermined direction.

4. The magnetic disk drive according to claim 3, wherein the predetermined direction is the direction from the innermost diameter side to the outermost diameter side of the magnetic disk.

5. A magnetic disk drive, which controls the seek and positioning of a magnetic head for recording and reproducing data to a specific position on the magnetic disk, in accordance with the servo data recorded in the magnetic disk, comprising:

measuring means for measuring one of an atmospheric pressure and a height above sea level, memory means for storing plural types of target speed tables indicating the relationship between the number of remainder tracks from a target track and the target seek speed of the magnetic head at a seek operation, and head positioning control means for selecting one of said plural type of the target speed tables stored in the memory means, in accordance with the measured values by the measuring means, setting a target seek speed according to the selected target speed table, and controlling the seek and positioning of the magnetic head to the specific position on the disk at the target speed.

6. A seek controlling method applied to a magnetic disk drive for controlling a seek and positioning of a magnetic head for recording/reproducing data to a specific position on a magnetic disk in accordance with servo data recorded in the magnetic disk, comprising the steps of:

measuring one of an atmospheric pressure and a height above sea level to obtain at least one measured value; and setting a seek speed when controlling the seek and positioning of the magnetic head to the specific position on the disk according to said at least one measured value.

7. The seek controlling method according to claim 6, wherein said seek speed setting step includes a substep of setting the seek speed to a value different from a reference value, in accordance with said at least one measured value, only when the seek is made in a predetermined direction.

* * * * *